US012451287B2

(12) United States Patent
Custy

(10) Patent No.: US 12,451,287 B2
(45) Date of Patent: Oct. 21, 2025

(54) RETENTION CLIPS FOR ASSEMLING FERRITE CORES TO CABLES

(71) Applicant: Fair-Rite Products, Corp., Wallkill, NY (US)

(72) Inventor: Joseph P. Custy, Pine Bush, NY (US)

(73) Assignee: Fair-Rite Products, Corp., Wallkill, NY (US)

( * ) Notice: Subject to any disclaimer, the term of this patent is extended or adjusted under 35 U.S.C. 154(b) by 0 days.

(21) Appl. No.: 18/610,377

(22) Filed: Mar. 20, 2024

(65) Prior Publication Data

US 2024/0371567 A1 Nov. 7, 2024

Related U.S. Application Data

(60) Provisional application No. 63/463,711, filed on May 3, 2023.

(51) Int. Cl.
*H01F 27/36* (2006.01)
*H01F 17/04* (2006.01)

(52) U.S. Cl.
CPC ........... *H01F 27/366* (2020.08); *H01F 17/04* (2013.01)

(58) Field of Classification Search
CPC ......................... H01F 27/263; H01F 2017/065
See application file for complete search history.

(56) References Cited

U.S. PATENT DOCUMENTS 4,591,819 A 5/1986 Nero
4,972,167 A 11/1990 Fujioka
5,355,109 A 10/1994 Yamazaki
5,537,087 A * 7/1996 Naito .................. H03H 1/0007 174/92
5,821,845 A * 10/1998 Ohashi .................... H01F 17/06 336/178
5,900,796 A 5/1999 Parker
6,346,673 B1 2/2002 Onizuka
6,559,748 B1 5/2003 Nakano
(Continued)

FOREIGN PATENT DOCUMENTS

JP H02-129706 U 10/1990
JP H04-137015 5/1992
(Continued)

*Primary Examiner* — Hung V Ngo
(74) *Attorney, Agent, or Firm* — Gerald E. Hespos; Michael J. Porco

(57) ABSTRACT

An electric noise suppressor is provided for suppressing electric noise of at least one cable. The suppressor includes first and second ferrite members. Each of the ferrite members has an inner surface and an outer surface facing away from the inner surface, the first and second ferrite members being disposed so the inner surfaces face one another. The suppressor further includes first and second retention clips. Each of the retention clips has a side wall and opposed first and second pressing walls extending from spaced apart locations on the respective side wall. The retention clips are disposed so that the first pressing walls engage the outer surface of the first ferrite member and the second pressing walls engage the outer surface of the second ferrite member. The first and second pressing walls are configured to press the inner surfaces of the first and second ferrite members toward one another.

15 Claims, 6 Drawing Sheets

(56) References Cited

U.S. PATENT DOCUMENTS

| | | | | |
|---|---|---|---|---|
| 7,834,731 | B2 * | 11/2010 | Kino | H01F 27/255 336/212 |
| 9,066,415 | B2 | 6/2015 | Konz | |
| 9,105,387 | B2 | 8/2015 | Kawai et al. | |
| 2018/0233263 | A1 | 8/2018 | Mizutani | |

FOREIGN PATENT DOCUMENTS

| | | | | |
|---|---|---|---|---|
| JP | 5-55048 | | | 3/1993 |
| JP | 5-159936 | | | 6/1993 |
| JP | H05211486 | A | * | 8/1993 |
| JP | H0686307 | A | * | 12/1994 |
| JP | 2003332136 | A | * | 11/2003 |
| JP | 2014-017449 | | | 1/2014 |
| JP | 2015-103613 | | | 6/2015 |

* cited by examiner

RETENTION CLIPS FOR ASSEMLING FERRITE CORES TO CABLES

CROSS-REFERENCE TO RELATED APPLICATION

This application claims priority to U.S. Provisional Patent Appl. No. 63/463,711, filed May 3, 2023, the entire disclosure of which is incorporated herein by reference.

BACKGROUND

Field of the Invention

This disclosure relates generally to a clip for holding a split core, such as a split ferrite core, at a specified position around one or more cables so that the core can suppress electric noise associated with the current flowing through the one or more cables.

Related Art

A ferrite is a ceramic-like material that typically comprises ferric oxide and another metal. Ferrites have been used for decades to suppress electronic noise associated with a current flowing through a cable or other conductor and/or to ensure that electronic noise generated elsewhere does not affect a signal carried through a cable or other conductor.

Many electric devices use a split ferrite core having two opposed halves that are mounted around one or more cables. A device then is required to hold the opposed halves of the split ferrite core in position on the cable or wire.

Resin casings are used widely for holding the opposed halves of a ferrite core in position on a cable. For example, U.S. Pat. No. 5,900,796 was assigned to the assignee of the subject application and discloses a casing with two halves connected to one another by hinges. Each half of the casing has a concave surface configured to receive one half of the split ferrite core. The halves of a split ferrite core are positioned in the respective halves of the casing. A first of the casing halves with a first half of the split ferrite core mounted therein is positioned to surround half of the cable at a selected position along the cable. The second casing half with the second half of the split ferrite core then is rotated about the hinges to enclose a selected section of the cable between the opposed halves of the split ferrite core. The opposed halves of the casing have locks that are configured to hold the halves of the casing in their closed position and to retain the split ferrite core around the cable. Additionally, the opposed tabs of the casing typically are configured to grip the cable for holding the ferrite core and the casing at a fixed position along the cable. Casings of the type described in U.S. Pat. No. 5,900,796 are still used widely and are shown in other patent references, including U.S. Pat. Nos. 9,066,415 and 9,105,387. These types of casings work very well but must be manufactured specifically to the shape and dimensions of the ferrite core with respect to axial, radial and circumferential shapes and dimensions. Thus, inventory management problems exist.

Ferrites also are used in transformers, and clips have been used to hold the ferrites of transformers in position. A typical clip for this purpose is generally C-shaped and has two opposed resiliently to flexible arms that extend generally parallel to the plane between the two opposed halves of a split ferrite core. The resilient arms of the C-shaped clip hold the opposed halves of the ferrite core in position. Examples of transformers with C-shaped clips for holding opposed halves of a split ferrite core in position around a transformer are shown, for example, in U.S. Pat. No. 4,591,819 and JP 5-5508. These clips generally work satisfactorily. However, there is a concern that these clips and a ferrite core engaged by the clips can move axially along a cable, particularly in a high vibration environment such as those encountered by an electric vehicle or a machine. Adhesive is applied to secure the clip to the ferrite.

Accordingly, an object of the invention is to provide clips for holding a split ferrite core on one or more cables.

Another object of the invention is to provide a clip that is not dimensionally specific to a particular ferrite core.

Still another object of the invention is to provide a clip that can be used with other identical or similarly configured clips combined in accordance with a longitudinal extent of the ferrite core along a cable.

A further object of the invention is to provide a clip for retaining a split ferrite core on a cable while providing redundant retention by a cable tie.

An additional object of the invention is to provide a clip that can engage at least one of the opposite ends of a ferrite core without a significant redesign of the clip.

SUMMARY OF THE INVENTION

One aspect of the invention relates to an assembly of a split ferrite core and retention clips for holding a split ferrite core in an assembled condition to surround a specified longitudinal section of one or more cables. More particularly, the ferrite core has first and second sections that typically are substantially identical to one another. Each half of the ferrite core has an inner surface. The inner surface of at least one of the ferrite cores has a concave region configured for partially surrounding and engaging a longitudinal section of a single cable or longitudinal sections of plural cables positioned laterally next to one another. The length of the cable that is to be engaged by the ferrite core will depend upon the specification of a particular application. Each half of the ferrite core also has a convex outer surface facing outwardly and away from the one or more cables. The convex outer surface of each half of the ferrite core further has one or more concave outer regions. For example, the one or more concave outer regions can be concave grooves that extend longitudinally along the respective half of the ferrite core.

Retention clips in accordance with this disclosure preferably are provided in pairs, and the retention clips in each pair may be identical. The retention clips of some embodiments are formed from a stamped sheet metal. However, retention clips formed from a resin material are possible.

Each retention clip has a side wall and opposite top and bottom pressing walls projecting from opposite top and bottom ends of the sidewall. The top and bottom pressing walls face one another and converge toward one another at farther distances from the sidewall. The projecting distance of each of the top and bottom pressing walls from the sidewall is less than a width of the ferrite core and typically is equal to or less than one-half of the width of the ferrite core. Ends of the top and bottom pressing walls remote from the sidewall define top and bottom core engaging projections, lips or ribs that face one another. The top and bottom core engaging projections of some embodiments are formed with elongate surfaces that extend parallel to one another and parallel to the cable that will be retained between the split core halves of the ferrite core. Surfaces of the core engaging projections that face one another may be convex curves. Additionally, the core engaging projections are dimensioned to engage in the concave outer regions of the respective halves of the ferrite core, and particularly in the concave grooves formed in outer surface regions of the respective halves of the split ferrite core.

The side wall of the retention clip has opposite first and second longitudinal ends. At least one core engagement tab projects from the first longitudinal end of the sidewall at a position lower than the top pressing wall and higher than the bottom pressing wall. A projecting direction of the at least one core engagement tab from the sidewall is the same as a projecting direction of the top and bottom walls from the sidewall. The second end edge of the sidewall of some embodiments has no core engagement tab. However, other embodiments are configured so that core engagement tabs project from both longitudinal ends of the sidewall of each retention clip Some embodiments of the retention clip have slots formed at top and bottom end regions of the sidewall at positions between the opposite first and second ends of the sidewalls. Additionally, the slots continue onto parts of the top and bottom pressing walls in proximity to the sidewalls. As explained further below, the slots can accommodate cable ties and are provided in those embodiments where a more secure retention of the ferrite core and retention clips on a cable may be required. The slots also can control the amount of force that is required to bias the top and bottom pressing walls sufficiently away from one for mounting each retention clip on the ferrite cores Some embodiments of the retention clip have first and second retention tabs projecting from opposite first and second ends of each of the top and bottom pressing walls. More particularly, the retention tabs on the top wall project up and the retention tabs on the bottom wall project down. The retention tabs can help retain cable ties on the retention clips and are provided on those embodiments where a more secure retention of the ferrite core and the retention clips on a cable may be required, such as on an automobile or some other high-vibration environment.

The retention clips are used by first assembling the ferrite core sections around one or more cables. The retention clips then are positioned so that the free ends of the top and bottom pressing walls face toward a lateral side of the ferrite core sections that are assembled onto the cable. Additionally, the retention clips are positioned so that the core engagement tab on a first of the retention clips aligns with a first longitudinal end of the assembled ferrite core sections and so that the core engagement tab on a second of the retention clips aligns with a second longitudinal end of the assembled ferrite core sections. Embodiments where each retention clip has two core engagement tabs are positioned so that the core engagement tabs align respectively with the opposite longitudinal ends of the ferrite core sections. The retention clips then are urged toward one another and toward the assembled ferrite core sections. The convex surfaces of the core engaging projections will engage the ferrite core sections, thereby causing the top and bottom pressing walls to deflect resiliently away from one another. The retention clips can be urged toward one another until the core engaging projections align with the grooves in the ferrite core sections. The top and bottom walls then will resiliently return toward one another so that the core engaging projections engage in the concave grooves on the ferrite core sections to retain the retention clips on the ferrite core and to urge the ferrite core sections toward one another and into engagement with the cables. In this mounted position, the core engaging tabs of the retention clips will engage against ends of the ferrite cores thereby limiting longitudinal movement of the retention clips along the ferrite core.

A cable tie can be wrapped around the retention clips that have been assembled onto the ferrite core. More particularly, the cable tie typically will be used with those embodiments of the retention clips that have the retention tabs and/or the slots. The cable tie can be positioned between the retention tabs that optionally are provided on the retention clip and/or will be engaged in the slots that extend through the retention clip at the bend between the sidewall and the top and bottom pressing walls.

The width of the retention clip measured parallel to the bends between the sidewall and the top and bottom pressing walls and parallel to the extending direction of the core engaging projections may approximate the length of the ferrite core. However, the retention clip can be used with ferrite cores that have a length significantly greater than the length of the retention clip. In this regard, a total of four retention clips can be used, with two of the retention clips being mounted to each of the two opposite sides of the ferrite core. The core engaging tabs on one lateral side of the retention clip will engage opposite longitudinal ends of the ferrite core on that side, while the core engaging tabs on the opposite lateral side of the retention clip will engage opposite longitudinal ends of the ferrite core on that side. The four retention clips used in this embodiment can be identical to one another or can be of different width dimensions.

The invention will be described below with respect to certain preferred embodiments. However, the invention defined by the claims is not limited to the illustrated embodiments or the description of those embodiments

DETAILED DESCRIPTION

A retention clip in accordance with a first embodiment of this disclosure is identified generally by the number 10 in FIGS. 1-4. The retention clip 10 of this embodiment is stamped from a sheet of carbon steel, such as AISI 1075 with a hardness in a range of HRC 45-48 and a thickness of 0.416 mm-0.455 mm or a sheet of stainless steel, type 301, having the surface passivated per ASTM A967. Retention clips formed from a resin material may be used in some applications.

Figure 1:
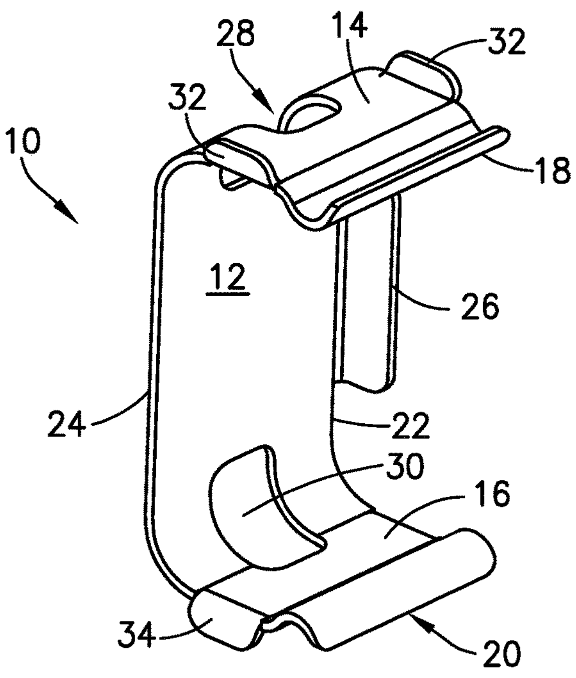
FIG. 1 is a perspective view of a retention clip in accordance with a first embodiment of the invention as viewed from a concave side of the retention clip and from the second end of the retention clip.
Figure 2:
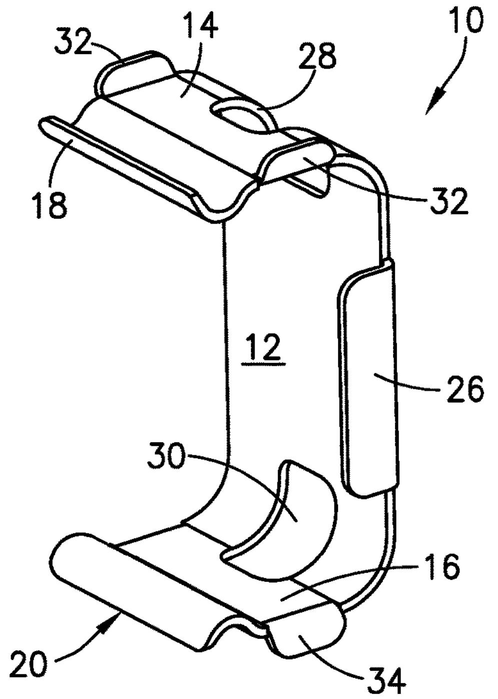
FIG. 2 is a perspective view of the retention clip of FIG. 1 as viewed from the concave side of the retention clip and from the first end of the retention clip.
Figure 3:
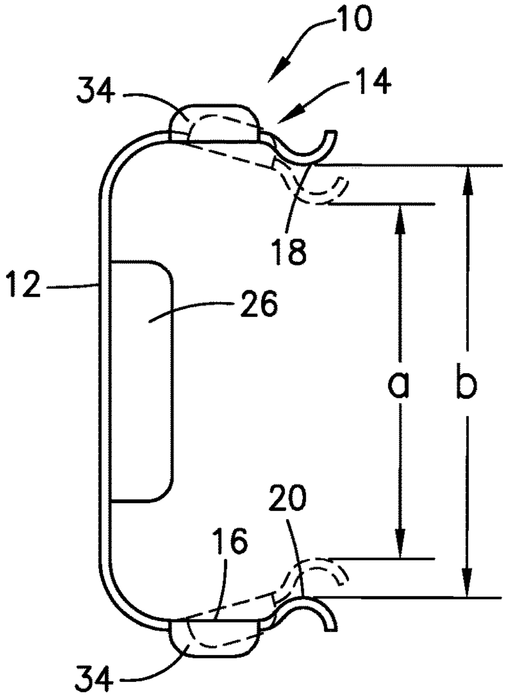
FIG. 3 is an end elevational view of the retention clip of FIGS. 1 and 2.
Figure 4:
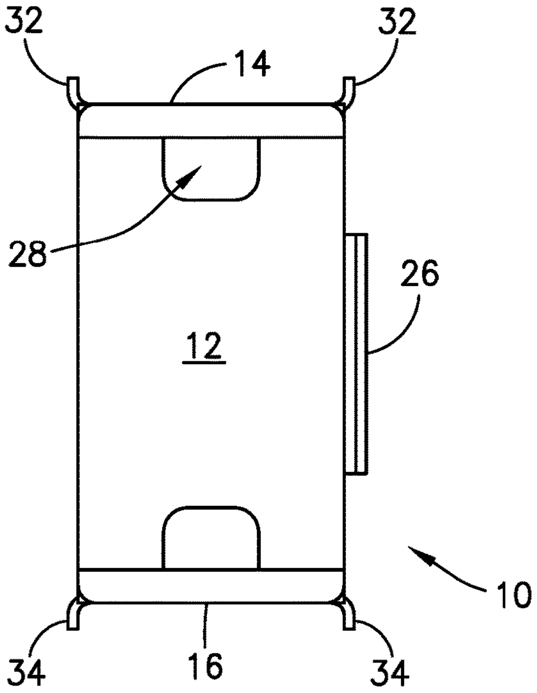
FIG. 4 is a side elevation view of the retention clip as viewed from the right side of FIG. 3.
Figure 5:
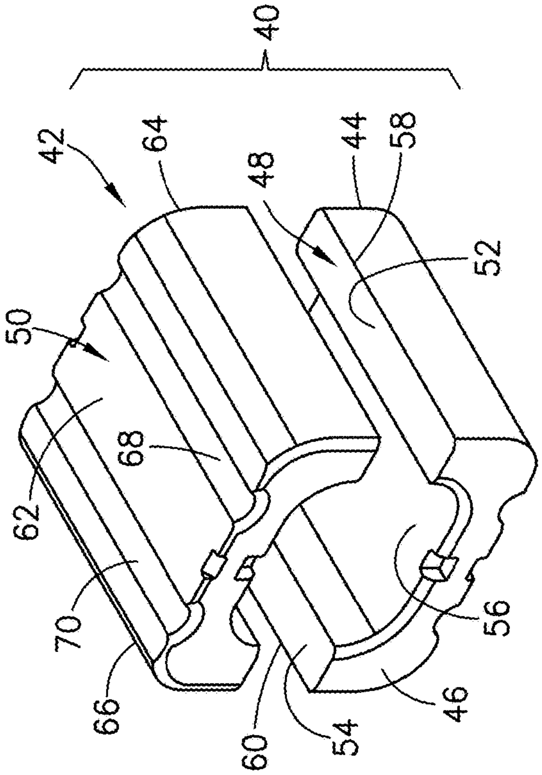
FIG. 5 is an exploded perspective view of a ferrite core with which the retention clip of FIGS. 1-4 can be used.
Figure 6:
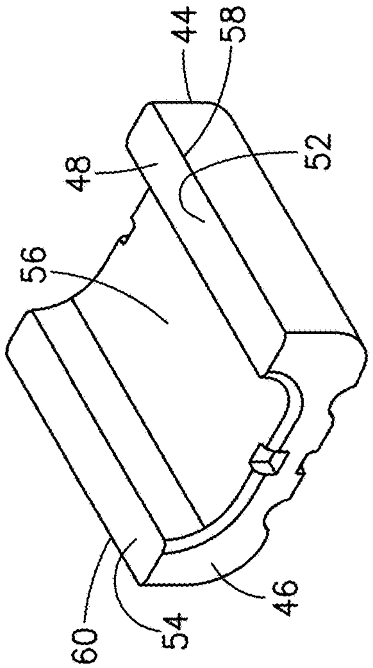
FIG. 6 is a perspective view showing an inner surface of one ferrite core section of the ferrite core shown in FIG. 5.
Figure 7:
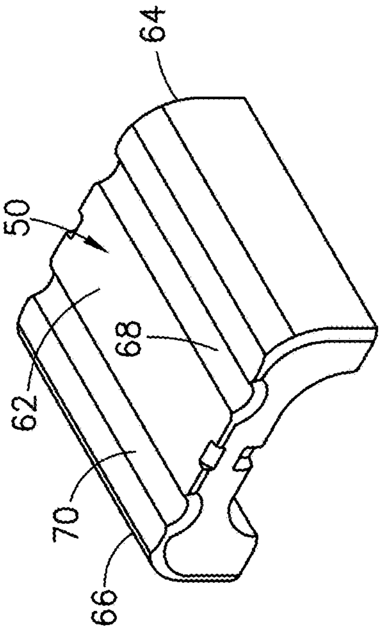
FIG. 7 is a perspective view showing an outer surface of the ferrite core section shown in FIG. 6.

Each retention clip 10 has a side wall 12 and opposite top and bottom pressing walls 14 and 16 projecting from opposite top and bottom ends of the sidewall 12. The terms "top" and "bottom" are used herein to provide a convenient identification and are not intended to imply a required gravitational orientation. The top and bottom pressing walls 14 and 16 converge toward one another at farther distances from the sidewall 12, as indicated by the dashed lines in FIG. 3. However, each of the top and bottom pressing walls 14 and 16 will deflect away from one another during mounting of the ferrite core, as explained below. The angular convergence of each of the top and bottom pressing walls 14 and 16, as indicated by the dashed lines in FIG. 3, from a normal to the sidewall 12 is about 10° in some embodiments. The lateral extent of each of the top and bottom pressing walls 14 and 16 from the sidewall 12 is less than a width of the ferrite core, and may have projecting dimensions of 8.0-14.3 mm in some embodiments. Ends of the top and bottom pressing walls 14, 16 remote from the sidewall 12 define top and bottom core engaging projections 18 and 20 that face one another. The top and bottom core engaging projections 18 and 20 are formed with elongate inwardly convex surfaces that face one another and extend parallel to one another and parallel to the cable that will be retained between the split cores of the ferrite core. Additionally, the core engaging projections 18. 20 are dimensioned to be engaged in concave outer regions of the respective halves of the ferrite core, and particularly in concave arcuate grooves formed in the respective halves of the split ferrite core, as explained below and shown in FIG. 5 for engagement by the convexly curved elongated core engaging projections 18 and 20. The convexly curved surfaces of the core engaging projections 18 and 20 continue to the ends of the top and bottom pressing walls 14 and 16 farthest from the side wall 12. A minimum distance "a" is defined between the convexly curved surfaces of the core engaging projections 18 and 20 when the top and bottom pressing walls 14 and 16 are in their unbiased condition, as shown by the dashed lines in FIG. 3. A greater minimum distance "b" is defined between the convexly curved surfaces of the core engaging projections 18 and 20 when the top and bottom pressing walls 14 and 16 are biased away from one another and into a condition where areas of the top and bottom pressing walls 14 and 16 adjacent the core engaging projections 18 and 20 are parallel, as shown by the solid lines in FIG. 3

The side wall 12 of the retention clip 10 has opposite first and second ends 22 and 24. A core engaging tab 26 projects from the first end 22 of the sidewall 12 at a position lower than the top pressing wall 14 and higher than the bottom pressing wall 16. A projecting direction of the core engaging tab 26 from the sidewall 12 is generally the same as a projecting direction of the top and bottom pressing walls 14 and 16 from the sidewall 12. The second end edge 24 of the sidewall 12 has no core engaging tab 26 in this embodiment.

The embodiment of the retention clip 10 illustrated in FIGS. 1-4 has optional slots 28, 30 formed at top and bottom regions of the sidewall 12 and with the slots 28, 30 being between the opposite first and second end edges 22, 24 of the sidewall 12. Additionally, the slots 28, 30 continue on to parts of the top and bottom pressing walls 14 and 16 in proximity to the sidewalls 12. As explained further below, the slots 28, 30 can accommodate cable ties or cable wraps and are provided in those embodiments where a more secure retention of the ferrite core and retention clips 10 on a cable may be required such as on an automobile or other high vibration environment.

The embodiment of the retention clip 10 illustrated in FIGS. 1-4 also has first and second cable tie retention tabs 32, 34 projecting from opposite first and second ends of each of the top and bottom pressing walls 14, 16. More particularly, the cable tie retention tabs 32 on the top pressing wall 14 projects up and the cable tie retention tab 34 on the bottom pressing wall 16 projects down. The cable tie retention tabs 32, 34 can help retain cable ties on the retention clips 10 and are provided on those embodiments where a more secure retention of the ferrite core and the retention clips 10 on a cable may be required.

Figure 8:
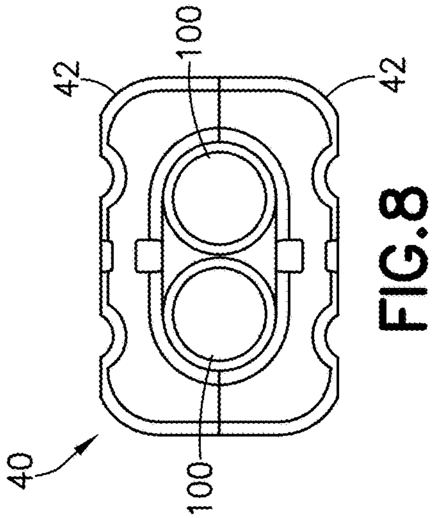
FIG. 8 is an exploded end elevational view of the ferrite core of FIG. 5.
Figure 9:
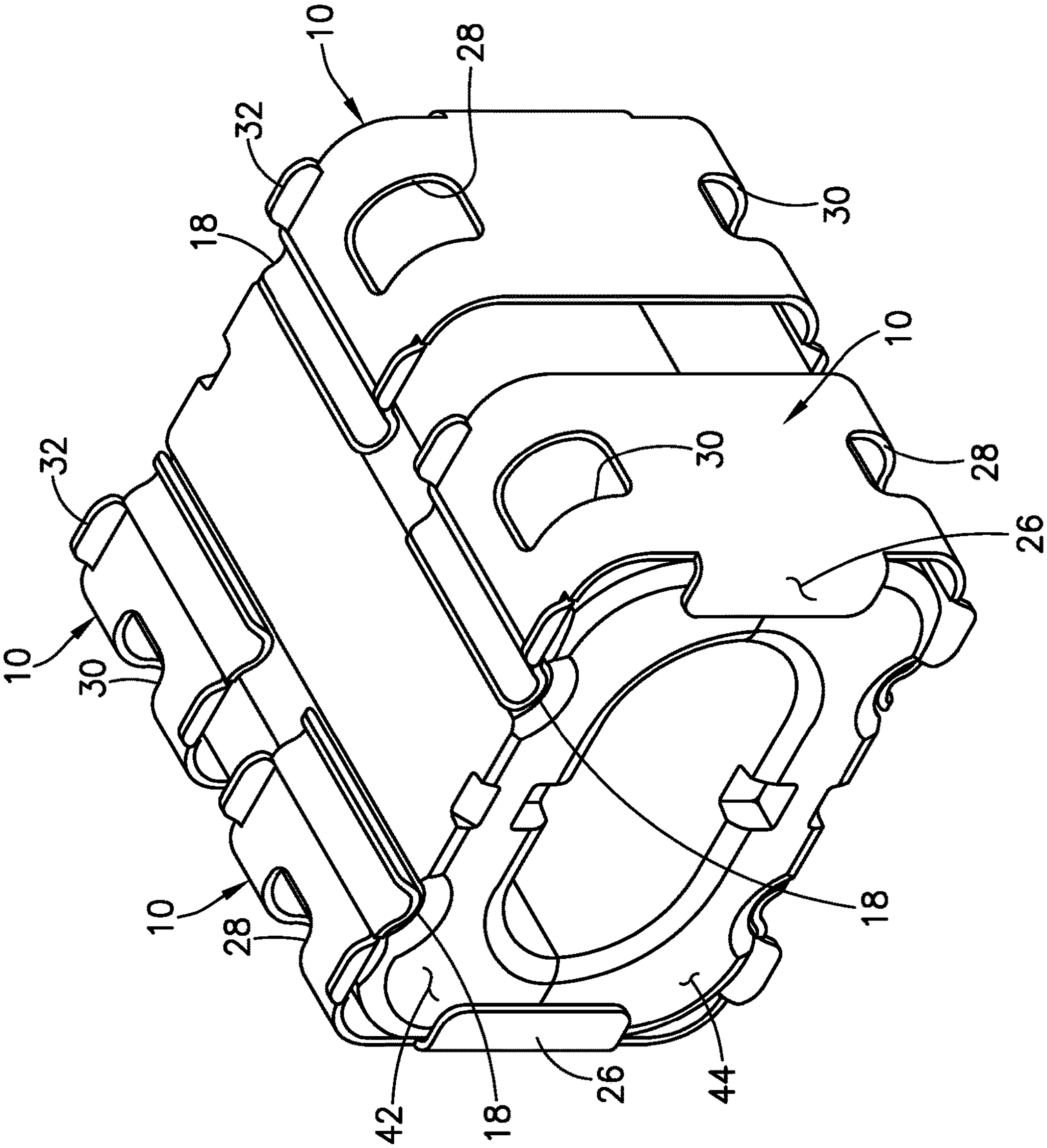
FIG. 9 is a perspective view showing four retention clips as illustrated in FIGS. 1-4 mounted to the ferrite core of FIGS. 5-8.
Figure 11:
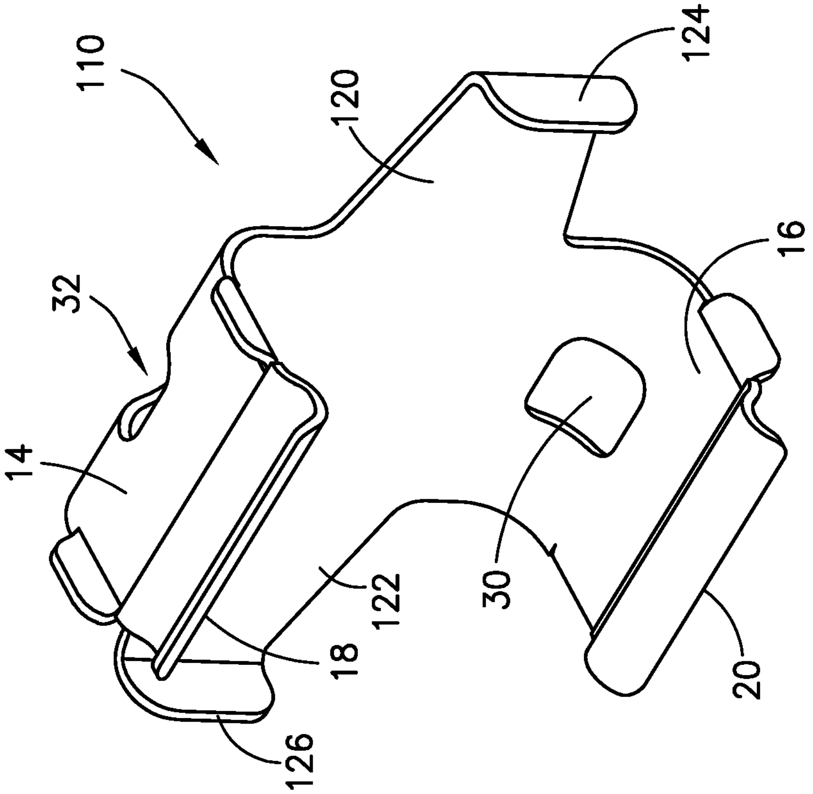
FIG. 11 is a perspective view of the retention clip of FIG. 10 as viewed from the convex or outer side of the retention clip.

Plural (typically two or four) identical retention clips 10 as shown in FIGS. 1-4 are used with a ferrite core 40 that is shown in FIGS. 5-9 by first assembling two identical ferrite core sections 42 around one or more cables 100. Each ferrite core section 42 has opposite longitudinal ends 44, 46, an inner surface 48 and an outer surface 50. The inner surface 48 is characterized by coplanar flat surfaces 52 and 54 and an elongated channel 56 extending between the opposite longitudinal ends 44 and 46. The channel 56 is disposed centrally between opposite outer side edges 58 and 60 and is configured to receive the two cables 100 in this embodiment. Other embodiments may have a channel to accommodate more or fewer cables. The coplanar flat surfaces 52 and 54 extend laterally from the channel 56 to the opposite outer side edges 58 and 60. The outer surface 50 of each of the ferrite core sections 42 has a flat center region 62 and convexly curved outer sections 64 and 66 that curve toward the opposite side edges 58 and 60. The outer surface of each of the ferrite core sections 42 further has concave arcuate grooves 68 and 70 that extend parallel to one another between the opposite ends 44 and 46 of each of the ferrite core sections 42. The grooves 68 and 70 are spaced inward from the convexly curved outer sections 64 and 66 of the outer surface 50 of the ferrite core section 42. The grooves 68 and 70 have radii that conform to the radius of the convex surface of each of the core engaging projections 18 and 20 of the top and bottom pressing walls 14 and 16 of the retention clip 10. A minimum distance "b" between the opposite grooves 68 or 70 when the ferrite core sections 42 are assembled, as shown in FIG. 8, equals and defines the distance between the convex surfaces of each of the core engaging projections 18 and 20 of the top and bottom pressing walls 14 and 16 the retention clip 10 when the top and bottom pressing walls 14 and 16 are biased away from one another, as shown in solid lines in FIG. 3. Additionally, the retention clips 10 and the ferrite core sections 42 are configured so that the convexly curved surfaces of the core engaging projections 18 and 20 of the retention clips 10 can engage the convexly curved outer surface areas 64 and 66 of the ferrite core sections 42 when the top and bottom pressing walls 14 and 16 are in their unbiased condition, as shown by the dashed lines in FIG. 3. Thus, movement of the retention clips 10 toward the ferrite core 40 will generate a sliding action between the convexly curved surfaces of the core engaging projections 18 and 20 and the convexly curved outer surface areas 64 and 66 of the ferrite core sections 42. This sliding interaction of the convexly curved surfaces will bias the top and bottom pressing walls 14 and 16 of the retention clip 10 from the converging alignment shown by dashed lines in FIG. 3 to the alignment shown by solid lines in FIGS. 3 and 9.

The retention clips 10 are positioned for assembly with the ferrite core 40 so that the free ends of the top and bottom pressing walls 14, 16 face toward the lateral side edges 58 and 60 of the ferrite core sections 42 that have been assembled onto the cables 100. Additionally, the retention clips 10 are positioned so that the core retention tab 26 on a first of the retention clips 10 aligns the first longitudinal end 44 of one of the ferrite core sections 42 and so that the core retention tab 26 on a second of the retention clips 10 aligns with a second longitudinal end 46 of another of the ferrite core sections 42. The retention clips 10 then are urged toward one another and toward the assembled ferrite core sections 42. The convex surface of the core engaging projections 18, 20 at the free ends of the top and bottom pressing walls 14, 16 will engage the convexly curved regions 64 or 66 of the ferrite core sections 42, thereby causing the top and bottom pressing walls 14, 16 to deflect resiliently away from one another. The retention clips 10 can be urged toward one another until the convexly curved surfaces of the core engaging projections 18, 20 align with the grooves 68, 70 in the outer surface 50 of the ferrite core section 42. The top and bottom pressing walls 14, 16 then will resiliently return toward one another and into substantially parallel alignment so that the core engaging projections 18, 20 engage in the concave grooves 68, 70 on the ferrite core sections 42 to retain the retention clips 10 on the ferrite core sections 42 and to urge the ferrite core sections 42 toward one another and against the cables 100. In this mounted position, the core engaging tab 26 of a first of the retention clips 10 will be engaged against a first end 44 of one of the ferrite core sections 42, while the core engaging tab 26 on a second of the retention clips 10 will be engaged against a second end 46 of the other ferrite core section 42, thereby limiting longitudinal movement of the retention clips 10 along the ferrite core sections 42.

The width of the retention clip 20 measured parallel to the bend line between the sidewall 13 and the top and bottom pressing walls 14, 16 and parallel to the extending direction of the core engaging projections 18, 20 is approximately the length of the ferrite core in this embodiment. However, the retention clip 10 can be used with ferrite cores that have a length significantly greater than the length of the retention clip 10. In this regard, a total of four retention clips 10 can be used, with two of the retention clips 10 being a mounted to each of the two opposite sides of the ferrite core sections 42. The core engaging tabs 26 on retention clips 10 on one lateral side 58 or 60 of the ferrite core sections 42 will engage one of the opposite longitudinal ends 44 or 46 of the ferrite core sections 42 on that side, while the core engaging tabs 26 on the opposite lateral side of the ferrite core sections 42 will engage the opposite longitudinal end 44 or 46 of the ferrite core sections 42 on that lateral side 58 or 60. The four retention clips 10 used in this embodiment can be identical to one another or can be of different length dimensions.

Figure 10:
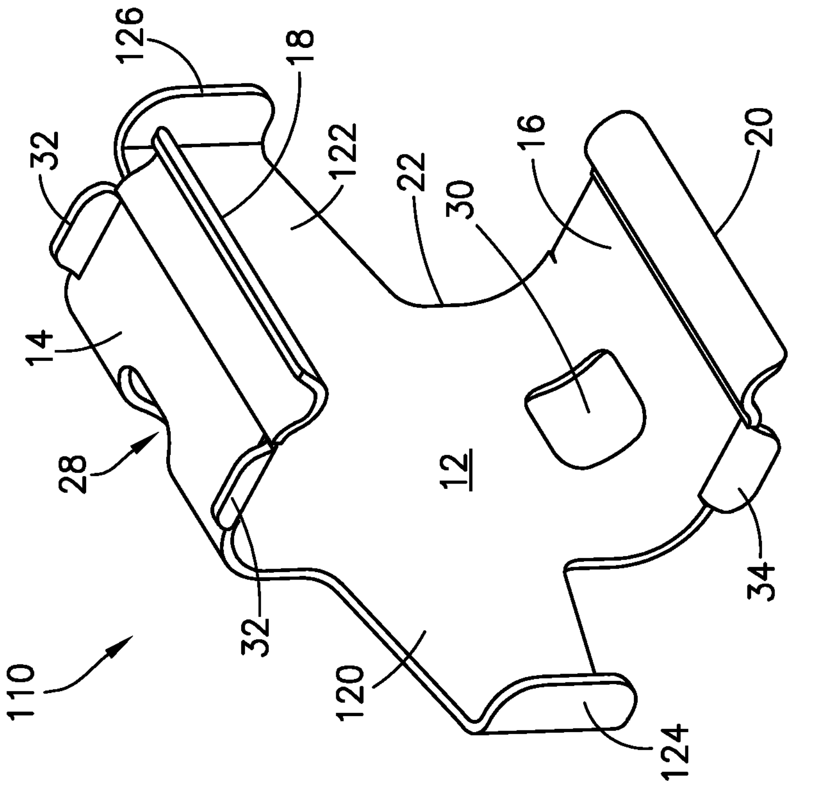
FIG. 10 is a perspective view of a retention clip in accordance with a second embodiment of the invention as viewed from a concave or inner side of the retention clip.
Figure 13:
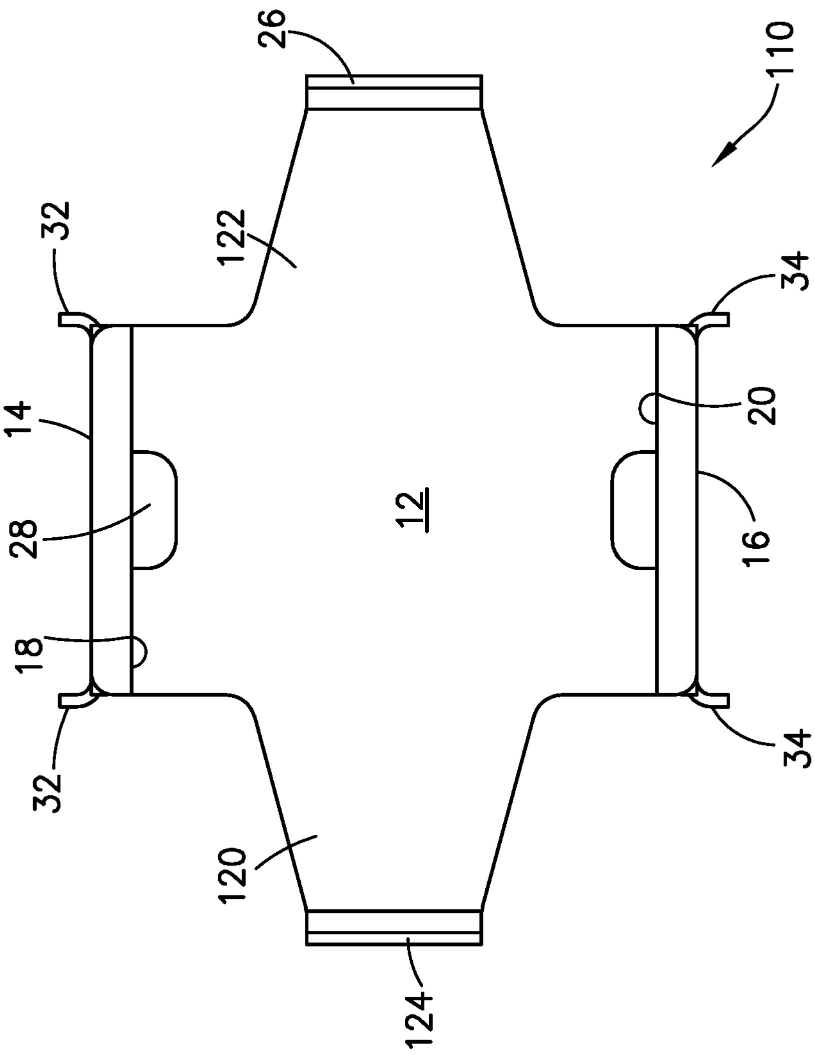
FIG. 13 is a side elevation view of the retention clip as viewed from the right side of FIG. 12.
Figure 12:
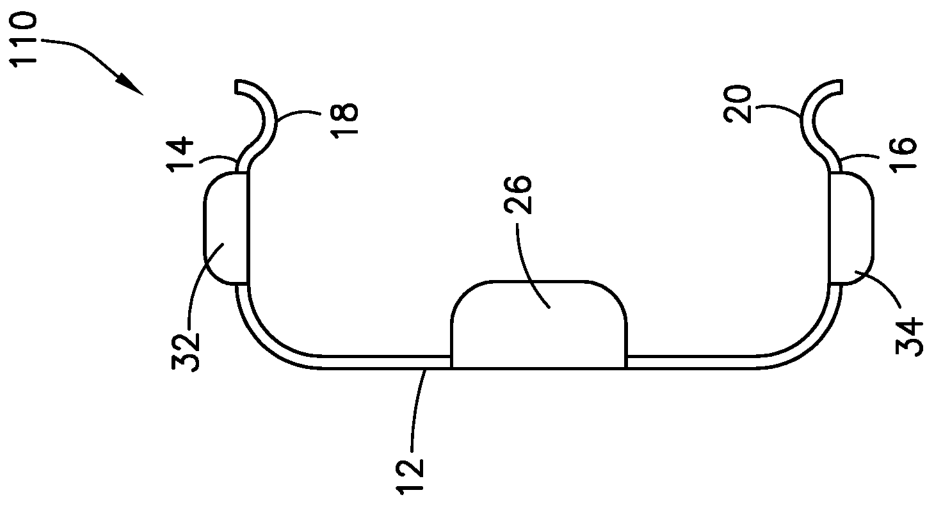
FIG. 12 is an end elevational view of the retention clip of FIGS. 10 and 11.
Figure 14:
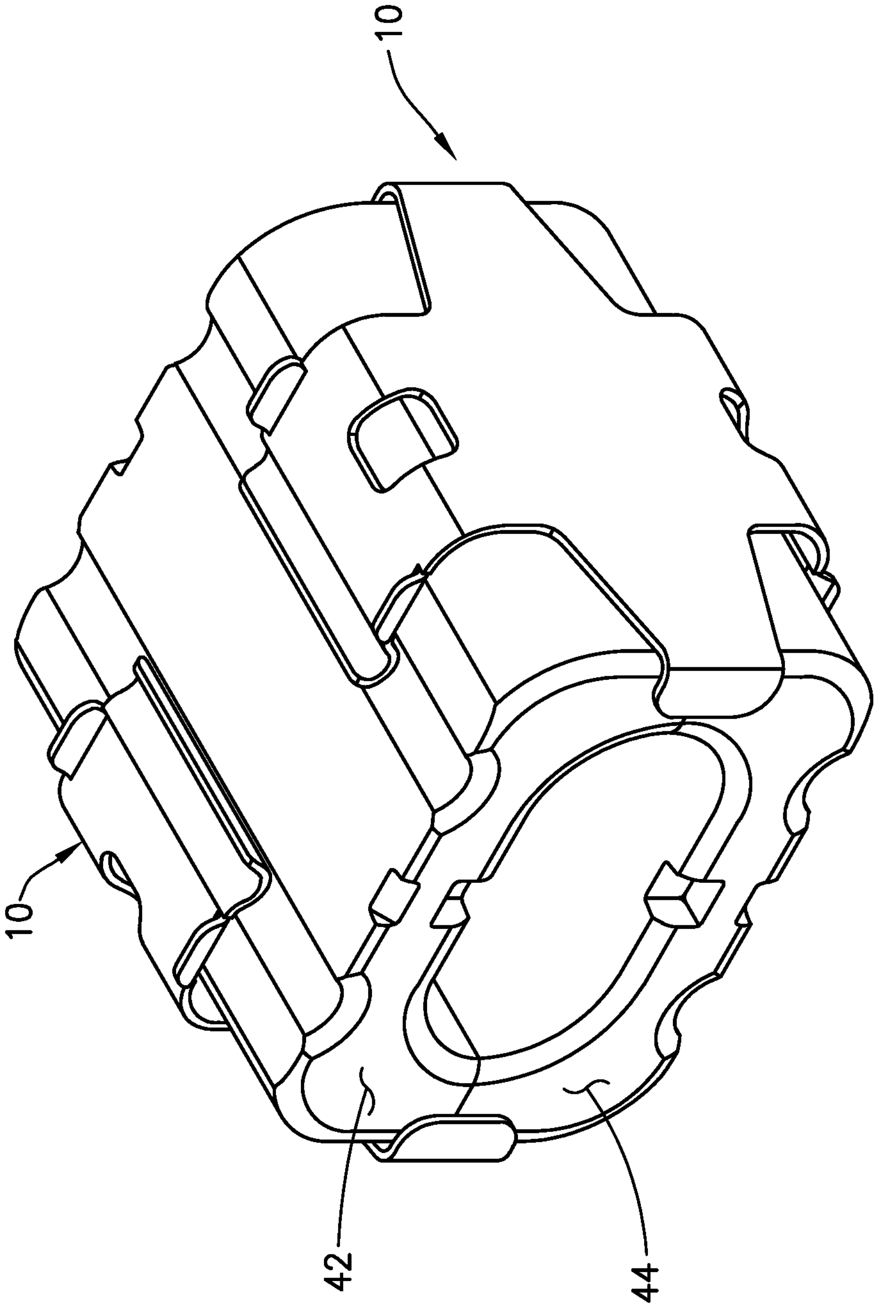
FIG. 14 is a perspective view of the retention clip of FIGS. 10-13 mounted to a split ferrite core.

FIGS. 10-13 illustrate an alternate retention clip that is identified generally by the numeral 110. For simplicity, aspects of the retention clip 110 shown in FIGS. 10-13 that are identical or substantially identical to the retention clip 10 of FIGS. 1-6 are identified by the reference numerals used in FIGS. 1-6 and are not described again. The retention clip 110 differs from the retention clip 10 in that the side wall 12 includes opposite wings 120 and 122 extending from opposite ends of the sidewall 12. The side wall 12 and the wings 120 and 122 lie in a common plane. Retention tabs 124 and 126 extend respectively from the ends of the wings 120 and 122 and project substantially perpendicular to the plane defined by the sidewall 12 and the wings 120, 122 and generally in the projecting direction of the top and bottom pressing walls 14 and 16. The distance between facing surfaces of the retention tabs 124 and 126 is substantially equal to a length of the ferrite core sections 42 with which the retention clip 110 is used. Thus, the retention tabs 124, 126 will engage opposite end regions of the ferrite cores sections 42 for more secure retention, as illustrated in FIG. 10.

While the invention has been described with respect to certain preferred embodiments, it is apparent that various changes can be made without departing from the scope of the invention as defined by the appended claims.

The invention claimed is:

1. An electric noise suppressor for suppressing electric noise to and from at least one cable, comprising:

first and second ferrite members, each of the ferrite members having an inner surface and an outer surface facing away from the inner surface, the first and second ferrite members being disposed so the inner surfaces face one another, each of the first and second ferrite members further having opposite first and second longitudinal ends; and first and second retention clips, each of the retention clips having a side wall and opposed first and second pressing walls extending from spaced apart locations on the respective side wall, the retention clips being disposed so that the first pressing walls engage the outer surface of the first ferrite member and the second pressing walls engage the outer surface of the second ferrite member, the first and second pressing walls being configured to press the inner surfaces of the first and second ferrite members toward one another, first and second wings projecting respectively from opposite ends of the side wall of each of the first and second clips, and first and core retention labs projecting respectively from projecting ends of the first and second wings, the first core retention tabs being engaged with the first longitudinal ends of the first and second ferrite members, and the second core retention tabs being engaged with the second longitudinal ends of the first and second ferrite members.

2. The electric noise suppressor of claim 1, wherein the inner and outer surfaces of each of the ferrite members meet at opposite first and second side edges, the two ferrite members being disposed so that the first and second side edges of the first ferrite member align respectively with the first and second side edges of the second ferrite member, the retention clips being disposed so that the side wall of the first retention clip engages areas of the outer surfaces of the first and second ferrite members adjacent the first side edges thereof and so that the side wall of the second retention clip engages areas of the outer surfaces of the first and second ferrite members adjacent the second side edges thereof.

3. The electric noise suppressor of claim 1, wherein the inner surfaces of the first and second ferrite members form at least one cable passageway extending between the longitudinal ends.

4. The electric noise suppressor of claim 3, wherein each of the pressing walls has a projection projecting toward the ferrite members, and wherein the outer surface of each of the ferrite members has depressions configured for engaging one of the projections when a corresponding one of the retention clips is mounted on the ferrite members.

5. The electric noise suppressor of claim 4, wherein the depressions in the outer surface of each of the ferrite members are elongated grooves extending between the opposite longitudinal ends of the respective ferrite member, and the projections in the pressing walls are elongated projections configured to engage respectively in the elongated grooves of the ferrite members.

6. The electric noise suppressor of claim 1, wherein each of the first and second retention clips has a first slot extending from the side wall to the first pressing wall and a second slot extending from the side wall to the second pressing wall, the slots being dimensioned to accommodate a wire wrap.

7. The retention clip of claim 1, wherein the retention clip is formed from a resiliently deflectable metal.

8. A retention clip for holding first and second electric noise suppression members in contact with one another and in surrounding relationship with at least one cable, the retention clip comprising:

a side wall;

first and second pressing walls extending from spaced apart positions on the side wall, the first and second pressing wall converging toward one another and being resiliently deflectable away from one another, end portions of the pressing walls spaced from the side wall being formed with elongated ribs extending parallel to one another and parallel to the side wall, surfaces of each of the ribs that face one another being arcuately convex;

at least one core retention tab extending substantially perpendicularly from a position on the side wall and in a direction so that a surface of the at least one core retention tab faces into a space between the first and second pressing walls; and a first slot extending from the side wall to the first pressing wall and a second slot extending from the side wall to the second pressing wall, the slots being dimensioned to accommodate a wire wrap.

9. The retention clip of claim 8, wherein the retention clip is formed from a resiliently deflectable metal.

10. A retention clip for holding first and second electric noise suppression members in contact with one another and in surrounding relationship with at least one cable, the retention clip being formed from a resiliently deflectable metal and comprising:

a side wall;

first and second pressing walls extending from spaced apart positions on the side wall, the first and second pressing walls converging toward one another and being resiliently deflectable away from one another, end portions of the pressing walls spaced from the side wall being formed with elongated ribs extending parallel to one another and parallel to the side wall, surfaces of each of the ribs that face one another being arcuately convex, opposed first cable tie retention tabs bent from opposite edges of the first pressing wall and projecting away from the second pressing wall, and opposed second cable tie retention tabs bent from opposite edges of the second pressing wall and projecting away from the first pressing wall, the cable tie retention tabs being dimensioned to retain a cable tie between the first and second cable tie retention tabs; and first and second core retention tabs extending substantially perpendicularly from opposite edge regions of the side wall and in a direction so that a surface of each core retention tab faces into a space between the first and second pressing walls.

11. An electric noise suppressor for suppressing electric noise to and from at least one cable, comprising:

first and second ferrite members, each of the ferrite members having an inner surface configured for at least partly surrounding the at least one cable and an outer surface facing away from the inner surface, the outer surface of each of the ferrite members meeting the inner surface of the respective ferrite member at first and second opposite side edges, the first and second ferrite members being disposed so the inner surfaces face one another, each of the first and second ferrite members further having:

first and second parallel grooves formed in the outer surface and extending parallel to the first and second side edges, a first convex curved surface between the first groove and the first side edge, and a second convex curved surface between the second groove and the second side edge; and first and second retention clips formed from a resiliently deflectable material, each of the retention clips having a side wall and opposed first and second pressing walls extending from spaced apart locations on the respective side wall, ends of the first and second pressing walls remote from the respective side wall having core engaging projections with convexly curved surfaces in opposed facing relationship, the convexly curved surfaces of the core engaging projections on the pressing walls being disposed to engage the convex curved surfaces of the first and second ferrite member so that pushing forces that urge the retention clips toward the ferrite members cause the pressing walls to deflect resiliently away from one another sufficiently for the convexly curved surfaces of the core engaging projections of the pressing walls to advance into resilient engagement with the grooves of the ferrite members.

12. The electric noise suppressor of claim 11, wherein each of the retention clips is formed from a resiliently deflectable metal.

13. The electric noise suppressor of claim 11, wherein the parallel grooves formed in the outer surface of each of the ferrite members extend between opposite longitudinal ends of the respective ferrite member.

14. The electric noise suppressor of claim 11, wherein each of the retention clips is dimensioned so that the side wall of the respective retention clip abuts the side edges of the ferrite members when the convexly curved surfaces of the core engaging projections of the pressing walls engage in the grooves of the ferrite members.

15. The electric noise suppressor of claim 11, wherein each of the first and second ferrite members has opposite first and second longitudinal end surfaces, and each of the first and second retention clips has first and second wings projecting respectively from opposite ends of the side wall of each of the first and second retention clips, and first and second core retention tabs projecting respectively from projecting ends of the first and second wings, the first core retention tabs being engaged with the first longitudinal end surfaces of the first and second ferrite members, and the second core retention tabs being engaged with the second longitudinal end surfaces of the first and second ferrite members.

* * * * *